United States Patent
Heisser et al.

(10) Patent No.: US 11,353,046 B2
(45) Date of Patent: Jun. 7, 2022

(54) MICROSCALE COMBUSTION FOR HIGH DENSITY SOFT ACTUATION

(71) Applicant: Cornell University, Ithaca, NY (US)

(72) Inventors: Ronald Heisser, Ithaca, NY (US); Robert Shepherd, Ithaca, NY (US); Cameron Aubin, Ithaca, NY (US)

(73) Assignee: Cornell University, Ithaca, NY (US)

( * ) Notice: Subject to any disclaimer, the term of this patent is extended or adjusted under 35 U.S.C. 154(b) by 0 days.

(21) Appl. No.: 16/997,929

(22) Filed: Aug. 19, 2020

(65) Prior Publication Data

US 2021/0310503 A1    Oct. 7, 2021

Related U.S. Application Data

(60) Provisional application No. 62/888,836, filed on Aug. 19, 2019.

(51) Int. Cl.
*F15B 15/10*    (2006.01)
*F15B 15/19*    (2006.01)

(52) U.S. Cl.
CPC .............. *F15B 15/10* (2013.01); *F15B 15/19* (2013.01)

(58) Field of Classification Search
CPC ........... F15B 15/10; F15B 15/19; F15B 15/00
USPC ......................................................... 60/632
See application file for complete search history.

(56) References Cited

U.S. PATENT DOCUMENTS

| | | |
|---|---|---|
| 6,397,595 B2 | 6/2002 | Benoit et al. |
| 6,628,040 B2 | 9/2003 | Pelrine et al. |
| 6,786,716 B1 | 9/2004 | Gardner et al. |
| 7,775,184 B2 | 8/2010 | Zak et al. |
| 8,297,237 B2 * | 10/2012 | Barth ............ F02M 29/08 123/19 |
| 2018/0363683 A1 | 12/2018 | Shepherd et al. |
| 2019/0184102 A1 | 6/2019 | Masumoto |
| 2019/0189374 A1 | 6/2019 | Masumoto |

FOREIGN PATENT DOCUMENTS

ES      2342520 A      7/2010

OTHER PUBLICATIONS

Ju, Y., et al., Microscale combustion: Technology development and fundamental research, Progress in Energy and Combustion Science, Apr. 16, 2011, vol. 37, No. 6, pp. 669-715.

Wu, M-H, Development and Experimental Analyses of Meso and Micro Scale Combustion Systems, PhD Thesis, The Pennsylvania State University Doctoral Thesis, 2007, 222 pages.

* cited by examiner

*Primary Examiner* — Michael Leslie
*Assistant Examiner* — Daniel S Collins
(74) *Attorney, Agent, or Firm* — Hodgson Russ LLP

(57) ABSTRACT

Disclosed herein are actuators and methods of making and actuating the same. Such actuators may comprise a body having a cavity, a membrane configured to cooperate with the cavity to form a combustion chamber, an inlet channel in fluid communication with the combustion chamber, an ignitor operable to ignite a combustible gas contained within the combustion chamber, and an outlet channel in fluid communication with the combustion chamber. The membrane may be configured to move in response to a change in pressure within the combustion chamber.

21 Claims, 14 Drawing Sheets

MICROSCALE COMBUSTION FOR HIGH DENSITY SOFT ACTUATION

CROSS REFERENCE TO RELATED APPLICATIONS

This application claims priority to U.S. Provisional Application No. 62/888,836, filed on Aug. 19, 2019, the entire disclosure of which is hereby incorporated by reference.

STATEMENT REGARDING FEDERALLY SPONSORED RESEARCH

This invention was made with government support under contract no. N00014-17-1-2837 awarded by the Office of Naval Research and contract no. FA9550-18-1-0243 awarded by the Air Force Office of Scientific Research. The government has certain rights in the invention.

FIELD OF THE DISCLOSURE

The disclosure generally relates to actuation devices, and in particular, microscale fluidic actuators.

BACKGROUND OF THE DISCLOSURE

High-density mechanical actuation systems are difficult to realize because valves and other necessary mechanical components required to enable and control motion in such systems are too large to fit in the same footprint as the actuators.

While many have attempted to produce high-density actuators using microelectromechanical (MEMS) technologies, the architecture of such systems is complex and expensive to produce. Furthermore, such systems are made with exceedingly thin and delicate layers of material, making them difficult to operate in uncontrolled environments.

Fluidic actuators are simpler, as pumping a fluid into a channel with a prescribed pressure can displace a membrane, thereby causing actuation. Such fluidic systems may be multiplexed to control hundreds and even thousands of individual actuators with tens of input controls. However, this solution has its limits-fluid pressure must be generated "off board" with an external pumping mechanism, and requires a separate pumping mechanism or set of control mechanisms for each desired input.

An exemplary application for compact actuators is a refreshable braille display, which allows a single device to continually update text for a vision-impaired person to read from a computer. The most substantial braille displays are extremely bulky, expensive, and typically show no more than 80 characters at a time. To date, the industry does not possess a cost-effective, portable, fast, full-page braille display.

SUMMARY OF THE DISCLOSURE

In an embodiment, an actuator may include a body having a cavity, a membrane configured to cooperate with the cavity to form a combustion chamber, an inlet channel in fluid communication with the combustion chamber, an ignitor operable to ignite a combustible gas contained within the combustion chamber, and an outlet channel in fluid communication with the combustion chamber. The membrane may be configured to move in response to a change in pressure within the combustion chamber.

The body may comprise a first layer and a second layer. At least a portion of the inlet channel may be disposed within the first layer or the second layer. At least a portion of the outlet channel may be disposed within the first layer or the second layer. At least a portion of the ignitor may be disposed within the first layer or the second layer.

At least a portion of the ignitor may extend into the cavity. The ignitor may comprise an electrode operable to cause a spark for igniting a combustible gas. The electrode may comprise a solid metal, a liquid metal, or a eutectic.

The electrode may comprise at least two electrode channels, each having an end separated by a spark gap. The electrode may further comprise a first electrode channel disposed in the body, a second electrode channel disposed in the body, and a liquid metal disposed in the first electrode channel and the second electrode channel. The first electrode channel may have a terminal end at the combustion chamber. The second electrode channel may have a terminal end at the combustion chamber and spaced apart from the terminal end of the first electrode channel.

The ignitor may comprise a heating element, a catalyst, or an electrode.

The body may have an elastic modulus greater than an elastic modulus of the membrane.

A combustible gas may be at least partially contained in the combustion chamber.

The combustible gas may be suitable for pure oxygen combustion according to the equation:

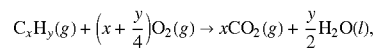

for varying quantities x of carbon and y of hydrogen, wherein x and/or y may be 0 or greater.

The combustible gas may be suitable for combustion of hydrocarbons in air according to the equation:

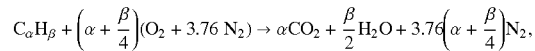

for varying quantities α of carbon and β of hydrogen, wherein α and/or β may be 0 or greater.

The outlet channel may be configured to restrict flow passively. The inlet channel may be configured to restrict flow passively.

The body and/or the membrane may be constructed of a soft material. For example, the material may have an elastic modulus below 1 MPa. In some embodiments, the membrane is softer than the body. For example, the membrane may have an elastic modulus that is an order of magnitude lower than that of the body. However, the body and membrane may have elastic moduli that are closer or similar. Characteristics of the body and the membrane may be adjusted by design of the geometries of the components (e.g., a thin membrane designed to move during combustion and a thick body designed to move less than the membrane). In some embodiments, the membrane is made from a hyperelastic material. For example, the membrane may be made from a material capable of stretching by 600% or more. Other materials may be used with less capability of stretching.

The actuator may further comprise a filter configured to reduce backpropagation of combustion from the combustion chamber into the inlet channel.

An actuator array may comprise two or more actuators according to any of the embodiments described herein. The inlet channel of the two or more actuators may be parallel, side-by-side, isolated, connected at a single plenum/hub, connected at multiple plenums/hubs, and/or form an inlet channel tree having one or multiple inlets leading to the inlet channels.

In another embodiment, a method of making an actuator may comprise forming a body having a cavity, disposing a membrane on the body such that the membrane cooperates with the cavity to form a combustion chamber, forming an inlet channel in fluid communication with the combustion chamber, and forming an outlet channel in fluid communication with the combustion chamber. The membrane may be configured to move in response to a change in a pressure within the combustion chamber.

The various components and their structures (e.g., the membrane, the body, the inlet channel, the outlet channel, etc.) may be fabricated using one or more techniques such as, for example, soft lithography, 3D printing, using micromachined molds, microelectromechanical system (MEMS) lithography, subtractive manufacturing, and/or semiconductor lithography.

The ignitor may comprise at least two electrode channels, each having an end separated by a spark gap. The method may further comprise forming a first electrode channel in the body, forming a second electrode channel in the body, and injecting a liquid metal into the first electrode channel. The first electrode channel may have a terminal end at the combustion chamber. The second electrode channel may have a terminal end at the combustion chamber and spaced apart from the terminal end of the first electrode channel.

In an embodiment, a method of actuating an actuator may comprise providing the actuator. The actuator may comprise a body having a cavity, a membrane configured to cooperate with the cavity to form a combustion chamber, an inlet channel in fluid communication with the combustion chamber, an ignitor operable to ignite a combustible gas contained within the combustion chamber, and an outlet channel in fluid communication with the combustion chamber. The membrane may be configured to move in response to a change in pressure within the combustion chamber. The method may further comprise passing a combustible gas through the inlet channel into the combustion chamber and operating the ignitor, thereby causing the combustible gas within the combustion chamber to ignite such that a pressure within the combustion chamber increases and the membrane moves.

BRIEF DESCRIPTION OF THE FIGURES

For a fuller understanding of the nature and objects of the disclosure, reference should be made to the following detailed description taken in conjunction with the accompanying drawings, in which.

DETAILED DESCRIPTION OF THE DISCLOSURE

Although claimed subject matter will be described in terms of certain embodiments, other embodiments, including embodiments that do not provide all of the benefits and features set forth herein, are also within the scope of this disclosure. Various structural, logical, process step, and electronic changes may be made without departing from the scope of the disclosure. Accordingly, the scope of the disclosure is defined only by reference to the appended claims.

Ranges of values are disclosed herein. The ranges set out a lower limit value and an upper limit value. Unless otherwise stated, the ranges include all values to the magnitude of the smallest value (either lower limit value or upper limit value) and ranges between the values of the stated range.

Embodiments disclosed herein include actuators and methods of making and using the same. Embodiments advantageously provide a working fluid having the energy needed for powering the actuator, thus energizing the device and reducing the need for off board pressure sources. Combustible air-fuel mixtures, which may passively flow through combustion channels, can be activated with, for example, low-energy sparks from electrodes to unleash high amounts of energy (~50 MJ/kg) at an instant. Therefore, embodiments may include a high-energy actuation system with a control system no more complex than the pattern of electrode wires.

Embodiments of the present disclosure can be made using soft lithographic methods. Such soft lithographic methods may include 3D-printed/micromachined molds, MEMS/semiconductor lithography methods, subtractive manufacturing, or other suitable methods.

Embodiments may include combustion chambers, outwardly deflecting membranes, and microfluidic channels. One or more of these components may be made out of, for example, polydimethylsiloxane (PDMS), silicones, other elastomers, or another suitable material.

The microfluidic channels may be configured to contain electrodes and/or gas flow. The microfluidic channels may be connected to (e.g., in fluid communication with) the combustion chamber. The placement of wires and geometry of the combustion chambers may vary.

Figure 1:
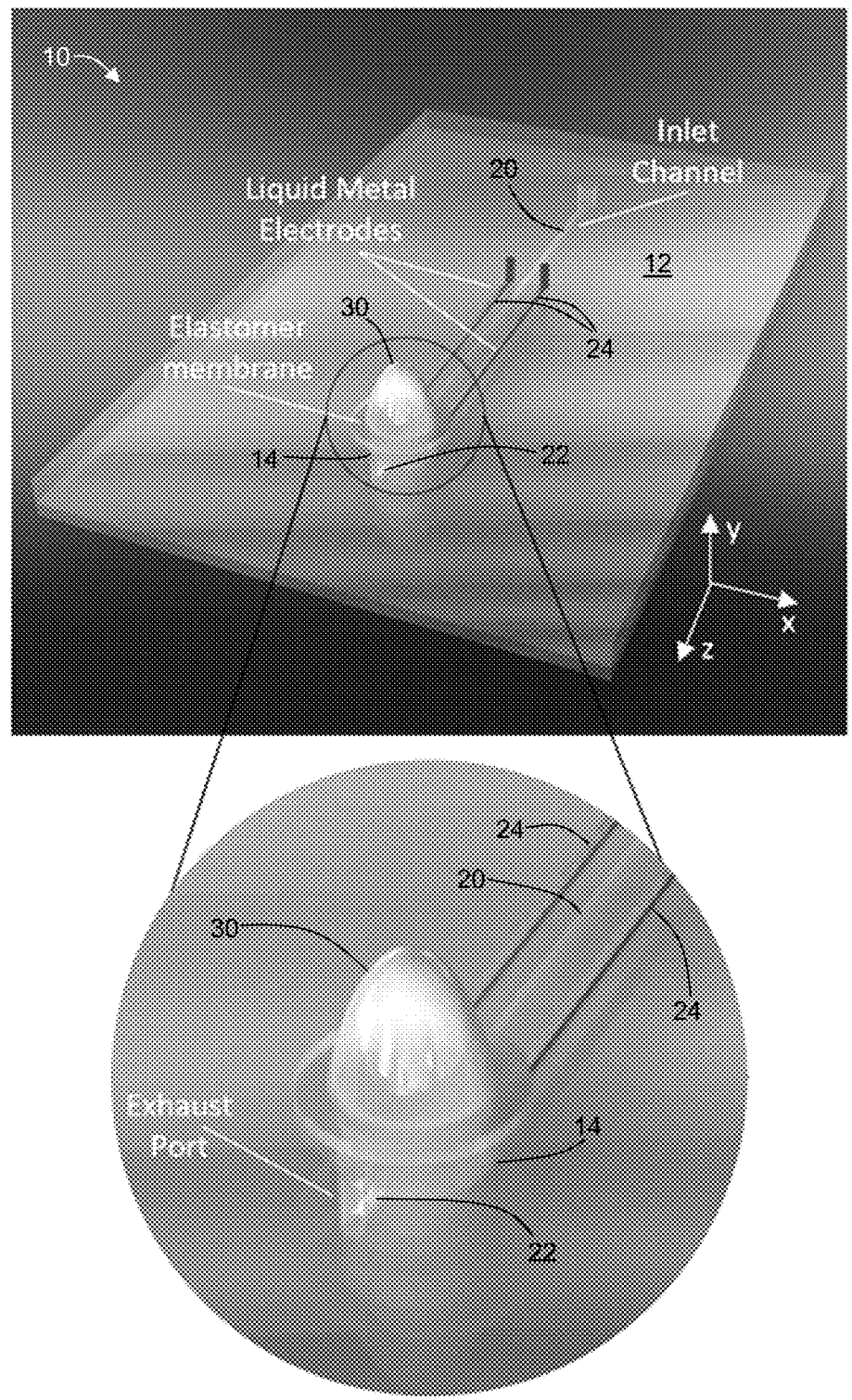
FIG. 1 illustrates an actuator according to an embodiment of the present disclosure.
Figure 2:
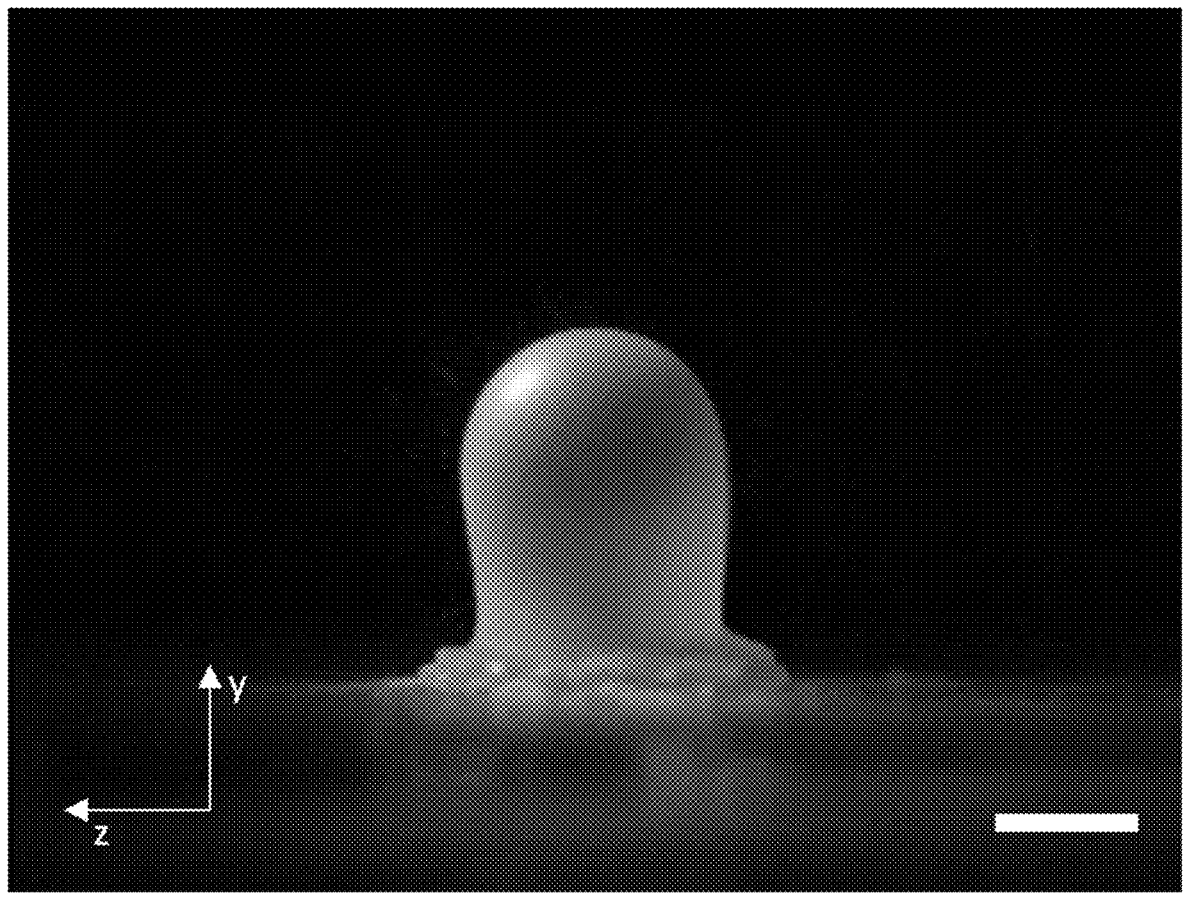
FIG. 2 is a photograph of a hyperelastic membrane deformed during combustion of the working fluid (combustion gas)

With reference to FIG. 1, in a first aspect, the present disclosure may be embodied as an actuator 10 having a body 12 with a cavity 14. The body 12 may be monolithic or it may be made from more than one component. For example, in some embodiments, the body is made up more than one layer. In this way, structures within the body (e.g., channels, etc.) may be formed in different layers of the body. In a particular example, a first layer (e.g., bottom layer) of the body may include one or more open channels formed therein, and a second layer (e.g., top layer) disposed on the first layer may then enclose the channels into tubular passages. Similarly, structures may be formed in a second layer, and the first layer may provide a bottom surface for the structures.

The actuator 10 further includes a membrane 30 configured to cooperate with the cavity 14 to form a combustion chamber (e.g., combustion cylinders 3A). As such, a change in pressure within the combustion chamber (for example, an increase in pressure due to combustion) will cause the membrane 30 to move—e.g., to be displaced, to elastically and/or positionally deflect, to deform, to translate, and/or other movement or combinations of movements. The membrane may be a soft, deformable membrane, a piston, a stretchable membrane (made from, for example, an elastic or hyperelastic material), or the like. In some embodiments, the actuator may be configured for long-term (but reversible) actuation such that the membrane remains displaced after combustion in the combustion chamber. For example, the membrane may be made using a bistable material. In another example, a permanent magnet may latch the membrane into a displaced position. In such embodiments, the membrane may be displaced temporarily (e.g., resetting to an undisplaced position after a period of time) or may remain displaced until actively (e.g., selectively) reset.

The actuator 10 includes an inlet channel 20 (e.g., a fuel channel) in fluid communication with the combustion chamber. The inlet channel 20 is configured to provide a supply of working fluid to the combustion chamber. The actuator 10 may also include an outlet channel 22 in fluid communication with the combustion chamber. The outlet channel 22 is configured to exhaust the working fluid from the combustion chamber. For example, the outlet channel may exhaust uncombusted working fluid and/or combustion byproducts (resulting from combustion of the working fluid) from the combustion chamber. The inlet channel 20 and/or the outlet channel 22 may be disposed within the body 12. The inlet channel 20 may be configured to restrict flow of fully or partially uncombusted combustible gas or other combustion products passively. For example, the inlet channel may comprise an orifice, check-valve, or the like, or combinations thereof.

The actuator includes an ignitor 24 operable to ignite a combustible gas (i.e., the working fluid) contained within the combustion chamber. The ignitor 24 may comprise a heating element, catalyst, electrodes such as, for example, a metal, a liquid metal, other conducting material, an ionic liquid used in liquid conductor solutions, and the like, or combinations thereof.

The combustible gas may be methane, butane, other hydrocarbon-based fuels, other combustible gases, liquids, hydrogen peroxide, or solid propellants with or without oxygen mixed in, and the like, or combinations thereof (further described below).

The ignitor 24 may extend into the cavity 14 fully or partially—e.g., at least a portion of the ignitor may extend into the combustion chamber. Alternatively, the ignitor may be within an antechamber within the body (or a first layer and/or a second layer thereof), or within cavity. Such an antechamber may be proximate the cavity and/or may be in fluid communication with the cavity.

The ignitor 24 may comprise one or more electrodes (e.g., a pair of electrodes). The electrode may be operable to cause a spark suitable to ignite the combustible gas, which may be in response to an applied voltage. For example, such a spark may be within the combustion chamber. The spark may be low-energy. For example, the spark may be caused by an application of electric current having a voltage above the dielectric breakdown voltage of air (e.g., 3 kV/mm and the like). This may be according to the Paschen dielectric breakdown curve appropriate for the reactant gas mixture selected to be combusted within the combustion chamber.

The electrode may comprise a metal or other conductive material. For example, the metal may be a solid metal or a metal that is a liquid at room temperature. The electrode may alternatively comprise wires or a circuit trace. For example, a circuit trace may be arranged on a circuit board, for example, a printed circuit board and the like.

The electrode may comprise at least two electrode channels. Each electrode channel may have an end separated by a spark gap. The electrode may, for example, comprise a first electrode channel and a second electrode channel disposed in the body. The first electrode channel may have a terminal end at the combustion chamber. The second electrode channel may have a terminal end at the combustion chamber and spaced apart from the terminal end of the first electrode channel. There may be a liquid metal disposed in the first electrode channel and in the second electrode channel.

The metal may be a liquid metal. Such liquid metals may include gallium, eutectic indium-gallium (EGaIn), or Galinstan, and the like, or combinations thereof. Such a liquid metal may be resistant to shear stresses. The liquid metal may thus be configured as a robust electrode connection. Such a liquid metal electrode may be arranged to have a spark gap with high resistivity, but not affecting its ability to produce a spark. For example, the spark gap may be 50 µm-100 µm, or up to 5 mm (or more), or as appropriate depending on parameters such as, for example, the size of the device, the combustible gas used, etc. After causing a spark, a liquid metal electrode may not erode in the same as a more traditional electrode. The liquid metal may form an oxide layer to be solid-like and stable at an open-air interface.

The ignitor may comprise a heating element. The heating element may be configured to heat the combustible gas past an ignition point thereof. For example, with a combustible gas containing methane, the heating element may be configured to heat at least a portion of the gas to a temperature higher than 600° C. Other suitable temperatures for compositions of the working fluid will be apparent to those having skill in the art. For example, the ignitor may comprise a small-scale microheater powered by electric current or by incident laser light of varying wavelengths.

The ignitor may include a catalyst selected to cause the combustible gas to ignite. Such a catalyst may be used as the ignitor either alone or in combination with other ignition modalities.

The body and/or the membrane may be constructed of a soft material. For example, the soft material may refer to a classification of materials. For example, such a soft material may comprise elastomeric materials, such as, for example, room-temperature vulcanization silicones, polydimethylsiloxane (PDMS), M4601, Sylgard 184, Ecoflex 00-30, urethanes, silicone, and the like, or combinations thereof.

The body may be made of a single material or multiple materials. In embodiments in which the body comprises a first layer and a second layer, the first layer may be made of a first material and the second layer may be made of the first material or a second material. Such materials may include, for example, metal, plastic, vinyl, Sylgard 184, Ecoflex 00-30, and the like, or combinations thereof.

In embodiments in which the body comprises a first layer 52A or a second layer 52B, at least a portion of the inlet channel may be disposed within the first layer 52A or the second layer 52B, at least a portion of the outlet channel may be disposed within the first layer 52A or second layer 52B, and at least a portion of the ignitor may be disposed within the first layer 52A or the second layer 52B.

In some embodiments, the membrane is made from an elastic material or a hyperelastic material. The body may have an elastic modulus greater than an elastic modulus of the membrane. For example, the membrane may have greater stretchability than the body.

Figure 8A:
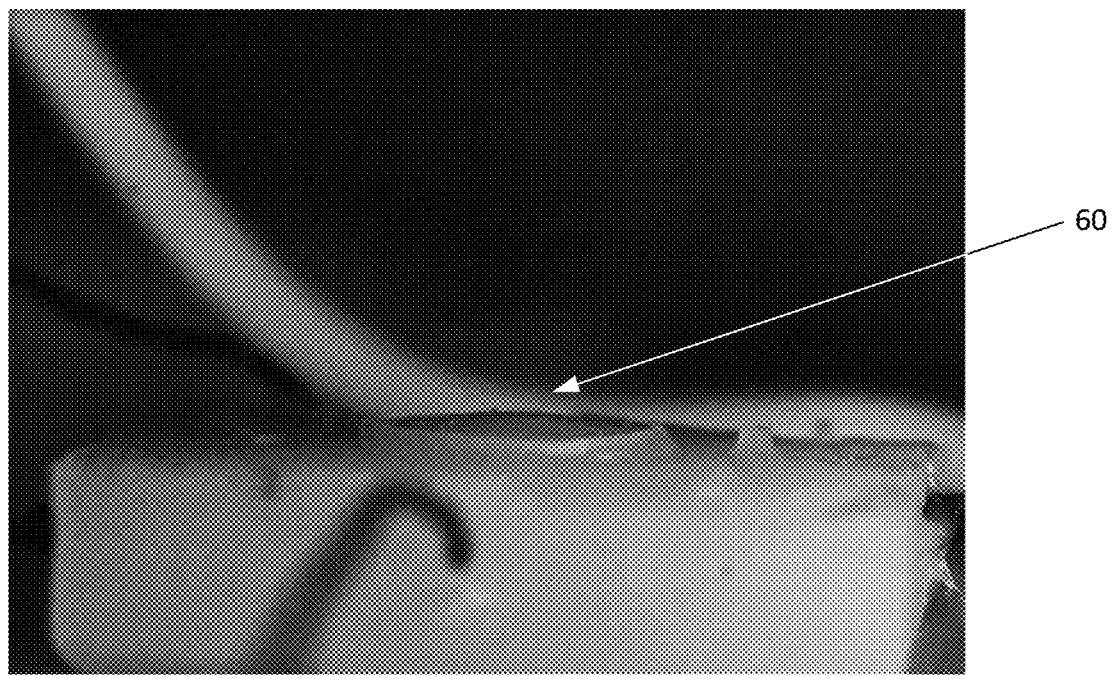
FIGS. 8A and 8B illustrate an example actuator having a membrane before deformation and during deformation.
Figure 8B:
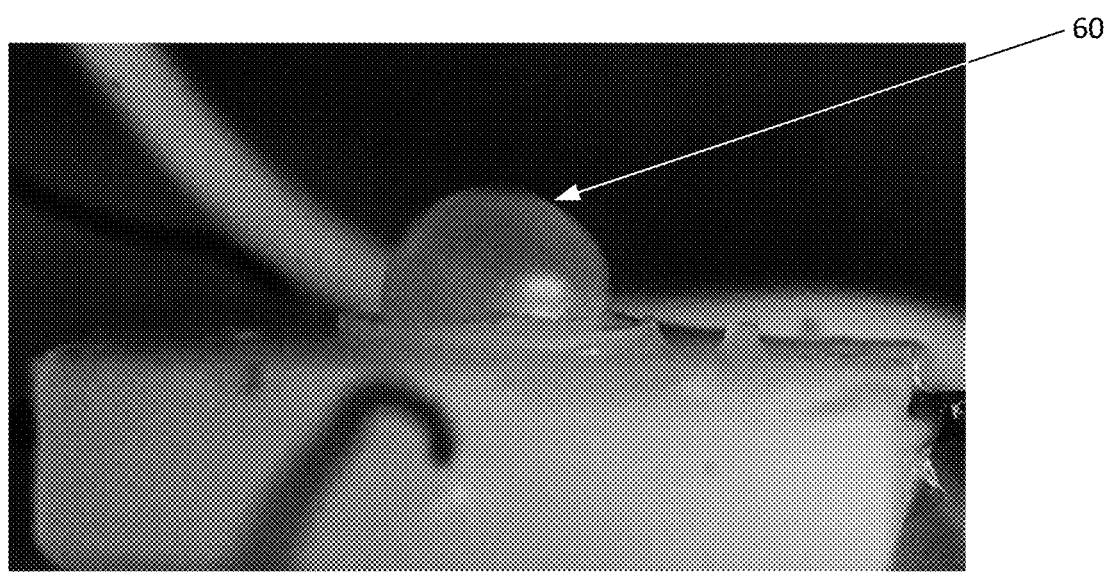

The membrane may be configured to move by deforming in response to a change in pressure within the cavity. An example of such deflection is depicted in FIGS. 8A and 8B, showing a membrane prior to deflection (6A) and during deflection (6B). In some embodiments, the membrane may be configured to deflect by unfolding/folding in response to a change in internal pressure in the cavity. For example, the membrane may be rigid with creases, folds, and/or joints such as, for example, a bellows. In some embodiments, the membrane may have varying thickness, or may be thinner than a portion of the body (e.g., sufficiently thin to deform upon a change in pressure within the cavity).

The membrane may have high resilience. Such resilience may be high compared to such forces the membrane may encounter from either combustion within the cavity or other external forces. In this way, the membrane is able to absorb the energy resulting from the combustion forces and return to its original shape after deformation. For example, such resilience may include resistance to impacts or resistance to sudden forces, toughness, deflection of membrane without breaking, resistant to puncture, resistance to high or low temperatures, resistance to other internal and external impacts, and other properties as appropriate defining resilience.

The inlet channel may be configured for flow of the combustible gas. The inlet channel may be impermeable to the combustible gas.

Although the term "combustible gas" is used herein, the term is intended to broadly include any combustible working fluid. For example, the working fluid may comprise one or more combustible gases, liquids (e.g., liquid particulates, aerosols, vapor, etc.), and/or solids (e.g., solid particulates, aerosols, etc.) For example, a combustible gas may be derived from the combustible liquid phase fuel, which may undergo vaporization and mixing with air or other gas/gas mixture to form the combustible gas, and may be delivered to the actuator 1 pre-mixed or in separate components. The combustible gas may be at least partially contained in the combustion chamber. For example, the combustible gas may comprise oxygen and methane. The combustible gas may comprise one or more hydrocarbons. In some embodiments, the combustible gas may be suitable for pure oxygen combustion according to equation (1) for varying quantities x of carbon and y of hydrogen:

$$C_xH_y(g) + \left(x + \frac{y}{4}\right)O_2(g) \rightarrow xCO_2(g) + \frac{y}{2}H_2O(l) \quad (1)$$

In equation (1), x and/or y may be 0 or greater.

In some embodiments, the combustible gas may be suitable for combustion of hydrocarbons in air according to equation (2) for varying quantities α of carbon and β of hydrogen:

$$C_\alpha H_\beta + \left(\alpha + \frac{\beta}{4}\right)(O_2 + 3.76 N_2) \rightarrow \alpha CO_2 + \frac{\beta}{2}H_2O + 3.76\left(\alpha + \frac{\beta}{4}\right)N_2 \quad (2)$$

In equation (2), α and/or β may be 0 or greater.

Further, solid propellants that may have single-time uses in the actuator may be used.

The combustible gas and/or oxygen or air may be supplied from an external source (for example, through an inlet port of the inlet channel or otherwise). In some embodiments, the actuator may include a source of combustible gas (e.g., in a reservoir, etc.)

The outlet channel may be configured for the flow of the combustible gas, which may be fully or partially uncombusted, or other combustion products. In embodiments in which the body may be monolithic, the outlet channel may be disposed within the body. In embodiments in which the body comprises a first layer and a second layer, the outlet channel may be disposed within the first layer or the second layer or partially within the first layer and/or partially within the second layer. The outlet channel may be configured to restrict flow of fully or partially uncombusted combustible gas or other combustion products passively. For example, the outlet channel may comprise within the channel or proximate to the channel an orifice, check-valve, or the like, or combinations thereof.

The actuator 10 may further comprise a filter 16, For example, filter 16 may be disposed within the cavity 14 or within the inlet channel 20. The filter 8 may be, for example, a mesh filter constructed of, for example, steel, or a material suitable for use as a flame arrestor. The filter 8 may be configured to reduce backpropagation of combustion (e.g., flames, vapors, or gases) of combustion from the combustion chamber into the inlet channel (e.g., at the time of combustion).

In some embodiments, the actuator 1 may have no mechanically-moving components other than the membrane or piston. In some embodiments, the actuator may include passive components (e.g., check valves, etc.) In some embodiments, the actuator may include active components (e.g., selectively operable valves, etc.)

Figure 3:
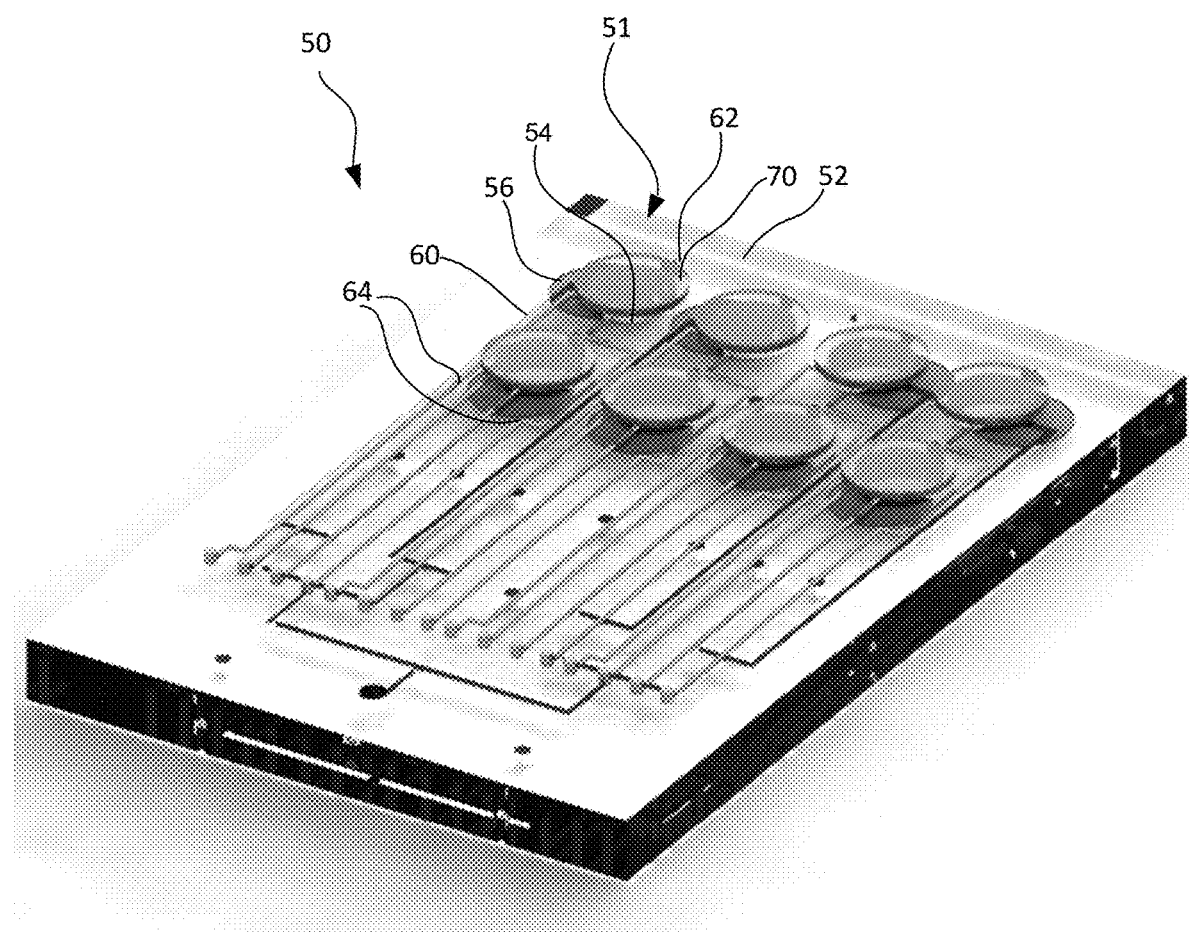
FIG. 3 depicts an actuator array according to another embodiment of the present disclosure.
Figure 4:
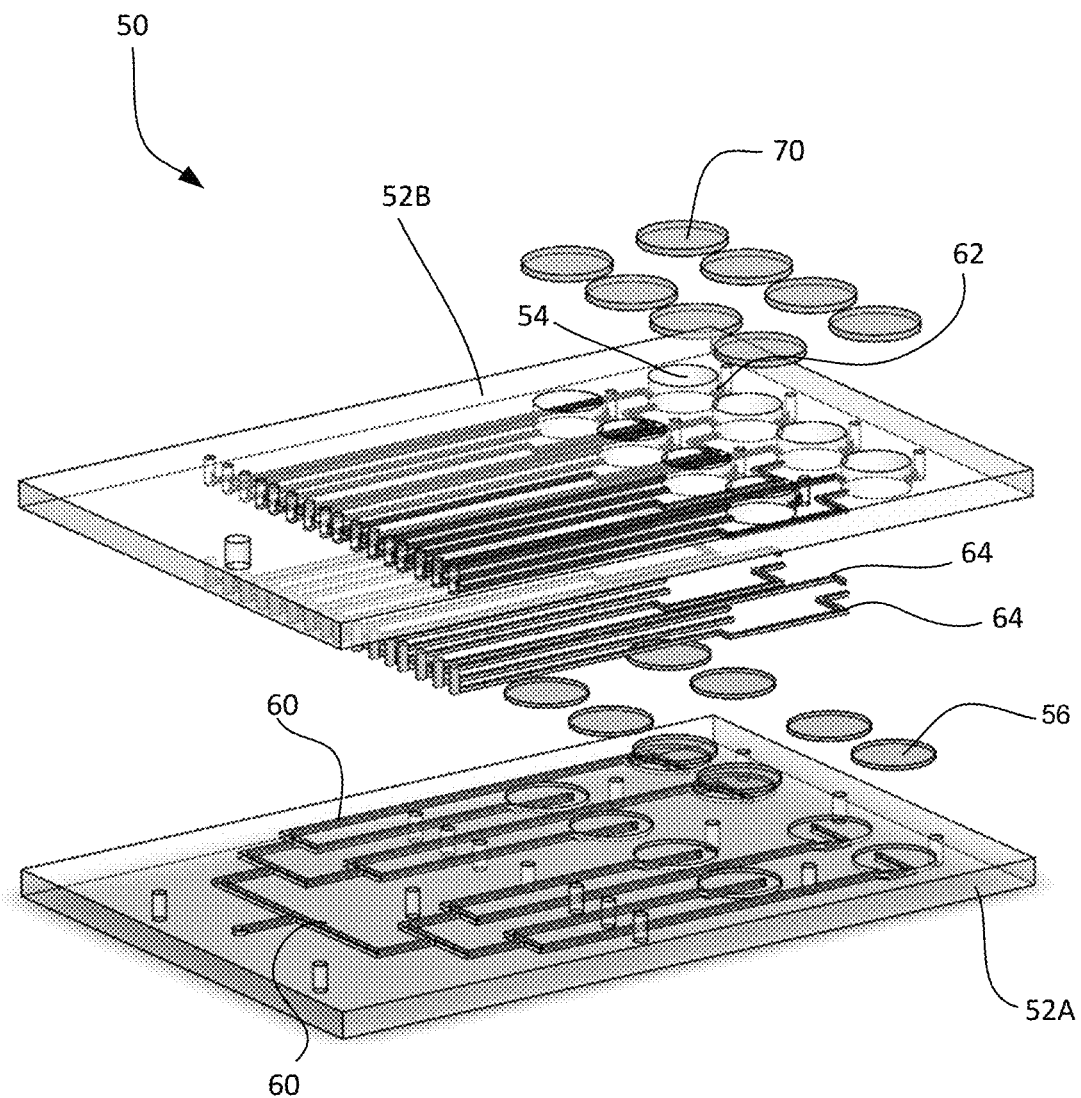
FIG. 4 illustrates an exploded view of the actuator array embodiment of FIG. 3.
Figure 5:
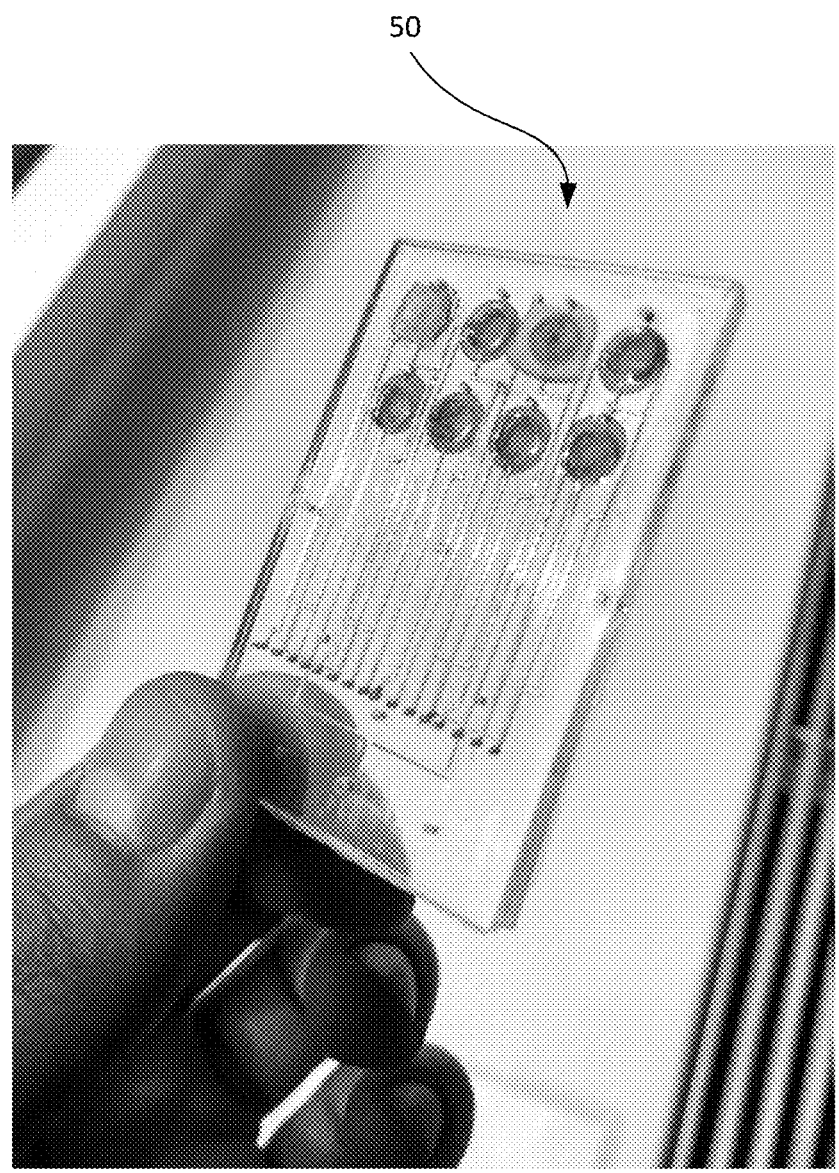
FIG. 5 is a photograph of an prototype actuator array.

In another embodiment, an actuator array, such as actuator array 50 illustrated in FIGS. 3-4, may comprise two or more actuators 51 as described herein. The inlet channels 60 of the two or more actuators 51 may be, for example, parallel, side-by-side, isolated, connected at a single plenum/hub, connected at multiple plenums/hubs, or form an inlet channel tree, which may have one or more inlets leading to the inlet channels 60. The inlet channels 60 and outlet channels 62, as well as the ignitors 64 may be arranged such that the combustion chambers and membranes 70 may be arranged in a desired configuration. For example, the actuators may be arranged in a two-dimensional array as depicted in FIGS. 3-7. The combustion chambers may form an array such as, for example combustion chamber array 3A. Such a two-dimensional array may be configured such that all or some of the actuators share inlet and outlet channels.

Figure 6A:
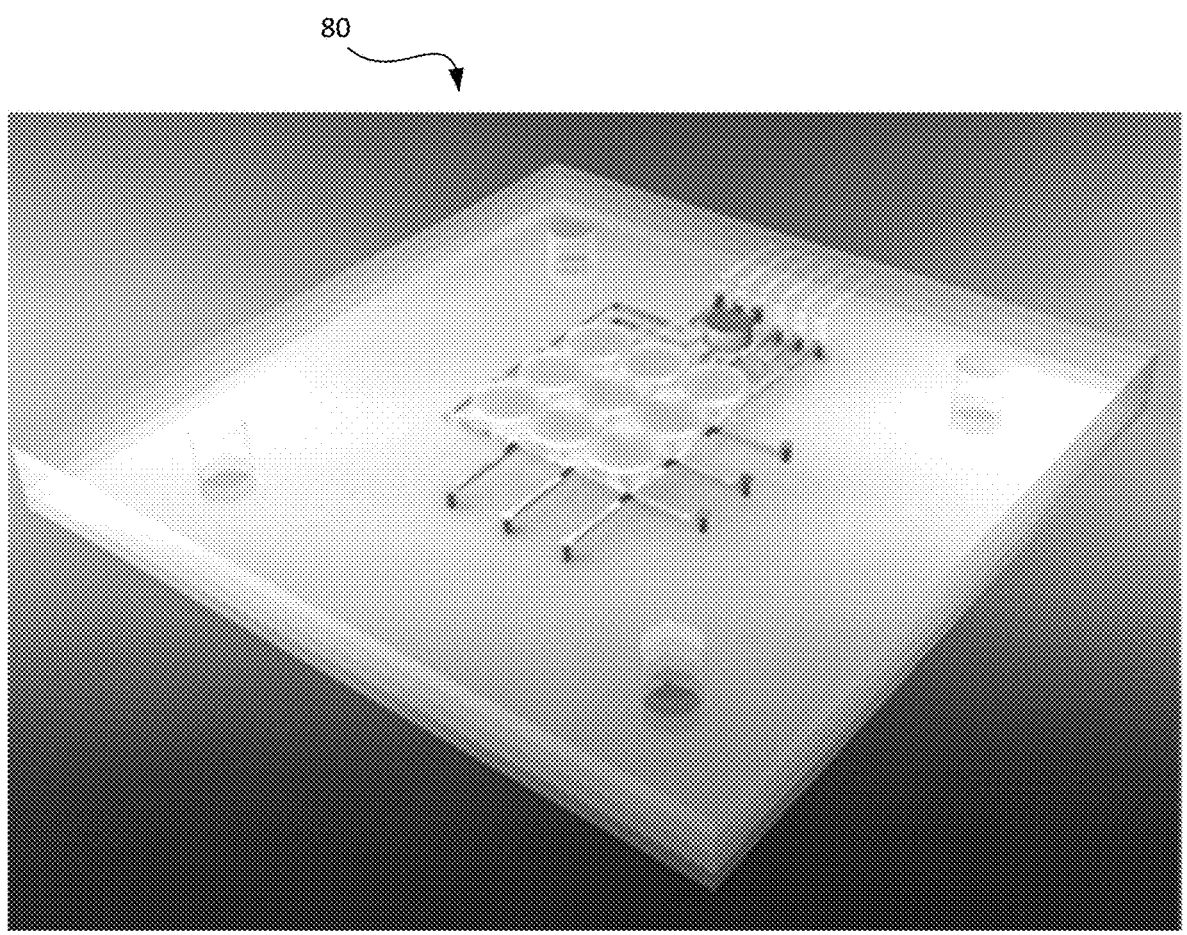
FIG. 6A illustrates an actuator array according to another embodiment of the present disclosure.
Figure 6B:
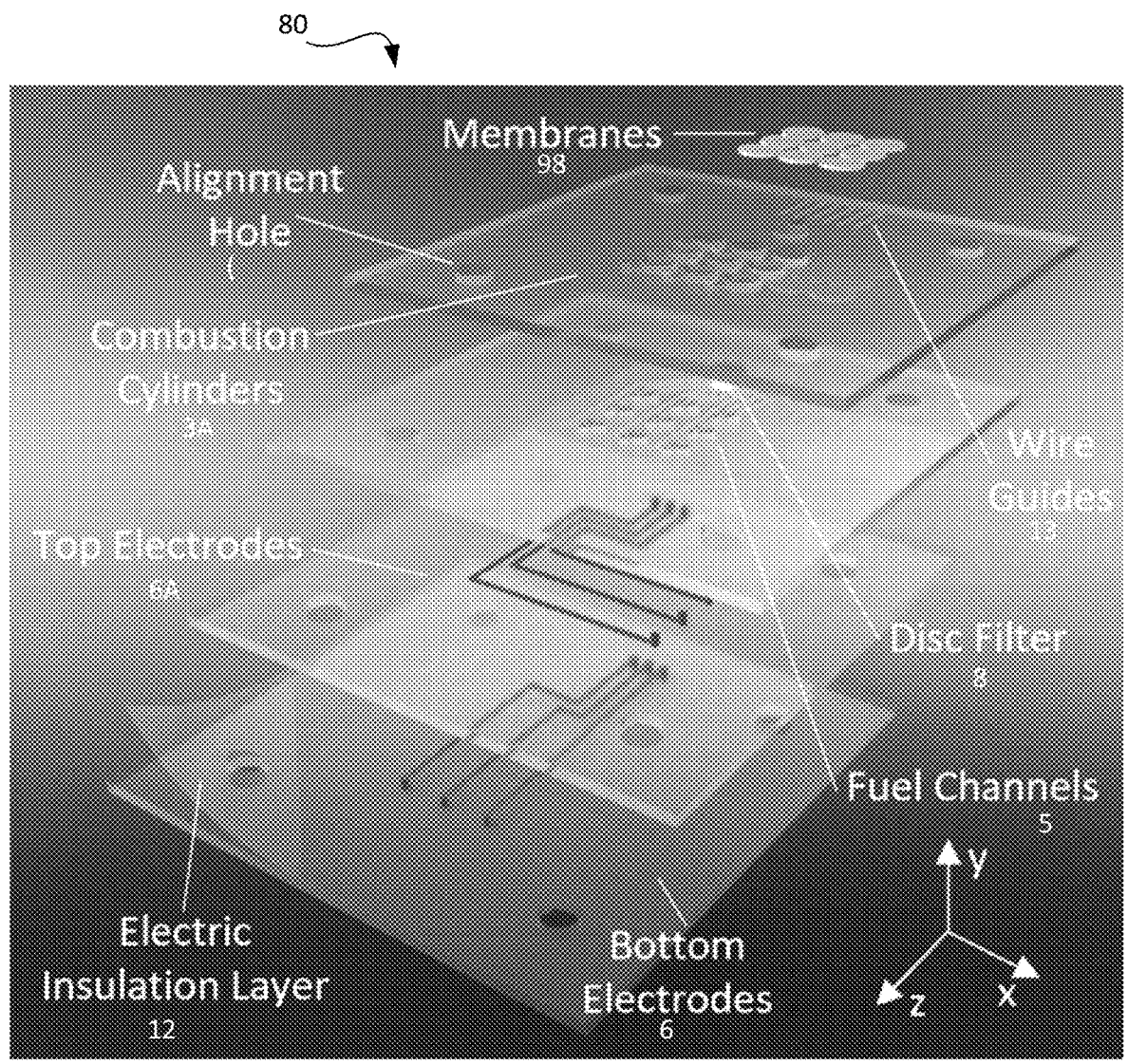
FIG. 6B illustrates an exploded view of the actuator array embodiment of FIG. 6A.
Figure 7:
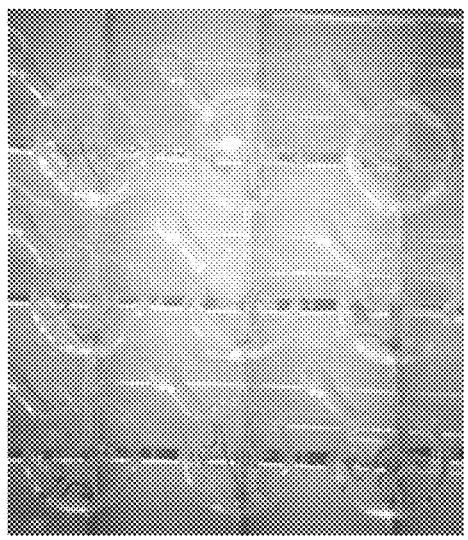
FIG. 7 is a photograph of an example 3×3 actuator array embodiment.

In another embodiment, an actuator array 80 is made up of a body 82 having multiple layers (see FIGS. 6A and 6b). A first layer 82A includes first electrodes 94 (bottom electrodes) of the actuators 81. A second layer 82B includes a second electrodes 95 (top electrodes) of the actuators 81. The first layer 82A and the second layer 82B may be separated by an insulator 83 (electric insulation layer in FIG. 6B) to electrically insulate the first electrodes 94 from the second electrodes 95. In this way, the electrodes may be routed in a more convenient manner that would not be possible if the first electrodes were coplanar with the second electrodes. Inlet channels 90 are disposed in a third layer 82C and outlet channels are disposed in a fourth layer 82D. Membranes 98 are disposed on the fourth layer 82D to form the combustion chambers. FIG. 6B also depicts wire guides 88 that are configured to interface with the first electrodes 94 and second electrodes 95. In this way, solid wires, metal traces, etc. may occupy the wire guides 99 and electrically connect with ends of the first and second electrodes (which may be a liquid metal).

Bodies comprised of more than one layer may include structures such as alignment holes for aligning each of the layers (see, e.g., FIGS. 6A and 6B).

Various embodiments may include devices comprising one or more actuators or actuator arrays, such as, for example, a tactile device, which may be high definition, a braille display, which may be refreshable, a micro-peristaltic pump, a haptic feedback device, a virtual reality device, or a soft robot that may be configured for precision control, and the like.

A refreshable braille display may be an embodiment of this technology, using actuators including long-term—but reversible—deformations (e.g., bistable membrane or permanent magnet latches). This system may also enable high-resolution tactile display systems for virtual reality applications. Other implementations might include micro-pumping systems and microscale soft robotic actuators.

Figure 9:
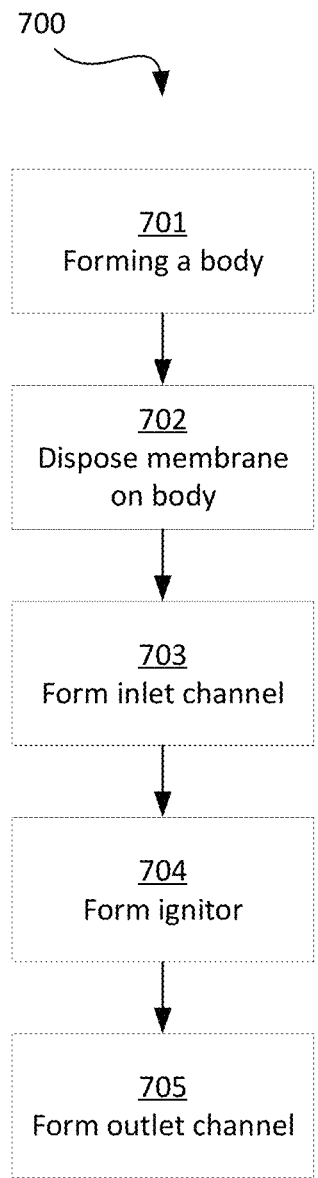
FIG. 9 illustrates a method of making an actuator according to an embodiment of the present disclosure.

Another embodiment is a method 700 of making an actuator, as illustrated in FIG. 9.

The method 700 may comprise, at 701, forming a body having a cavity.

The method 700 may further comprise, at 702, disposing a membrane on the body such that the membrane cooperates with the cavity to form a combustion chamber. The membrane may be configured to move in response to a change in pressure within the combustion chamber.

The method 700 may further comprise, at 703, forming an inlet channel in fluid communication with the combustion chamber.

The method 700 may further comprise, at 704, forming an ignitor operable to ignite a combustible gas contained within the combustion chamber.

The method 700 may further comprise, at 705 forming an outlet channel in fluid communication with the combustion chamber.

Forming the membrane, the body, the inlet channel, and/or the outlet channel may be by, for example soft lithography, 3D printing, using micro-machined molds, microelectromechanical (MEMS) lithography and/or semiconductor lithography, subtractive manufacturing, and the like, or combinations thereof.

The ignitor formed by method 700 may comprise at least two electrode channels, each having an end separated by a spark gap. A first electrode channel in the body may be formed. The first electrode channel may have a terminal end at the combustion chamber. A second electrode in the body may be formed. The second electrode channel may have a terminal end at the combustion chamber and spaced apart from the terminal end of the first electrode channel. The first and second electrode channels may be formed as part of the formation of the body, for example, the first and second electrode channels may be formed simultaneously. Liquid metal may be injected into the first electrode channel and the second electrode channel.

Forming the membrane, body, inlet channel, outlet channel, and electrode may comprise, in any appropriate order: spraying nonstick coatings on a 3D-printed mold of device's individual soft layers, the 3D-printed mold configured to form a combustion chamber layer having a combustion chamber, fuel inlet channels, and electrode inlet channels; filling the 3D-printed molds with a liquid elastomer prepolymer; curing, by heating, the liquid elastomer-prepolymer to form the combustion chamber layer within the 3D-printed mold; peeling the combustion chamber layer out of 3D-printed mold; coating the combustion chamber layer with a thin, uncured elastomer prepolymer over the inlet channel, bonding the combustion chamber to a thin bottom membrane; filling electrode inlet channels in the combustion chamber layer with a liquid metal; cutting a hole through the membrane under the combustion chamber; cleaning the electrode at a wall of combustion chamber of an excess liquid metal; peeling the fuel line layer out of the 3D-printed mold; coating the fuel line layer with a thin, uncured elastomer prepolymer over inlet channels; bonding the fuel line layer to a bottom of the combustion chamber layer; forming a hyperelastic membrane and cutting the hyperelastic membrane into a shape matching the combustion chamber shape; and bonding the hyperelastic membrane to the combustion chamber layer using a silicone epoxy adhesive. The actuator may be configured to connect to an external fuel source and/or power electronics.

The electrode may be formed by injecting liquid metal into the inlet channel or another inlet channel configured to hold the electrode. The electrodes may be made by injecting liquid metal or other suitable conductor, for example, gallium or eutectic indium-gallium (EGaIn) into the microfluidic channels. The electrodes may be connected to the combustion chamber. Alternatively, the electrodes may be made by injecting liquid metal or other suitable conductor into a microfluidic channel built directly into the deflecting membrane. The injection may be performed using a syringe and a tube tip.

The method 700 may be used for making an two or more actuators composing an actuator array.

Figure 10:
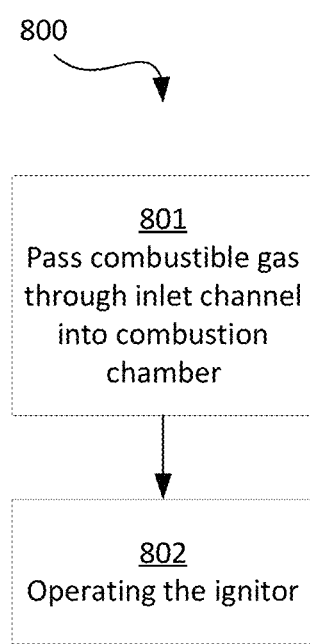
FIG. 10 illustrates a method for actuating an actuator according to an embodiment of the present disclosure.

An embodiment may comprise a method 800 for actuating an actuator, as illustrated in FIG. 10. The method 800 may comprise, at 801, passing a combustible gas through the inlet channel into the combustion chamber and, at 802, operating the ignitor, thereby causing the combustible gas within the combustion chamber to ignite such that a pressure within the combustion chamber increases and the membrane moves. The membrane may move (e.g., deflect outward, for example, away from the actuator, thus forming a portion raised from the top surface of the actuator. Operating the ignitor at 802 may comprising applying an applied voltage to an electrode composing the ignitor to yield a spark within the combustion chamber. Actuating each actuator may comprise vaporizing a combustible liquid phase fuel and combining the resultant vaporized combustible liquid phase fuel with air to form the combustible gas.

The method may further comprise passing uncombusted or combusted combustible gas through an outlet channel, which may be to atmosphere or to other gas management devices or materials, such as, for example, carbon filters or gas recirculating mechanisms. Flow through the outlet channel may be passively restricted.

Actuator arrays according to embodiments herein may be actuated by the method 800, for any number of two or more actuators composing the actuator array.

Figure 11A:
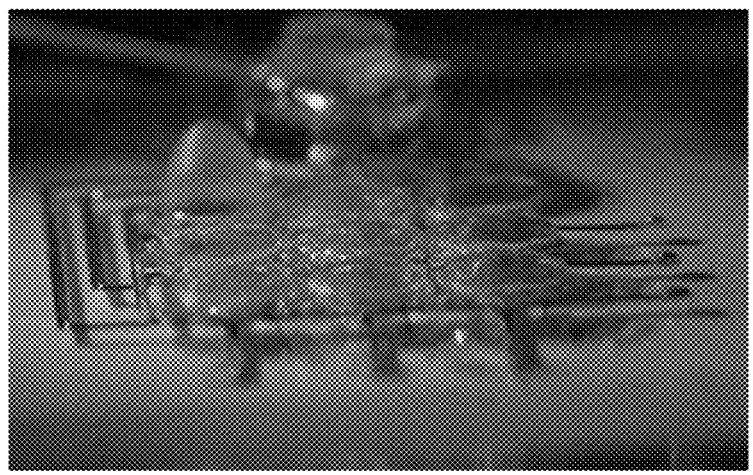
FIGS. 11A-11C are photographs showing actuation of various actuators of an example actuator array embodiment.
Figure 11B:
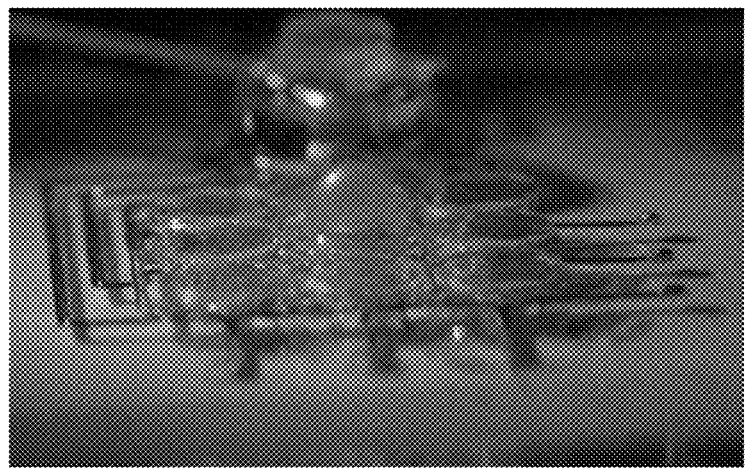
Figure 11C:
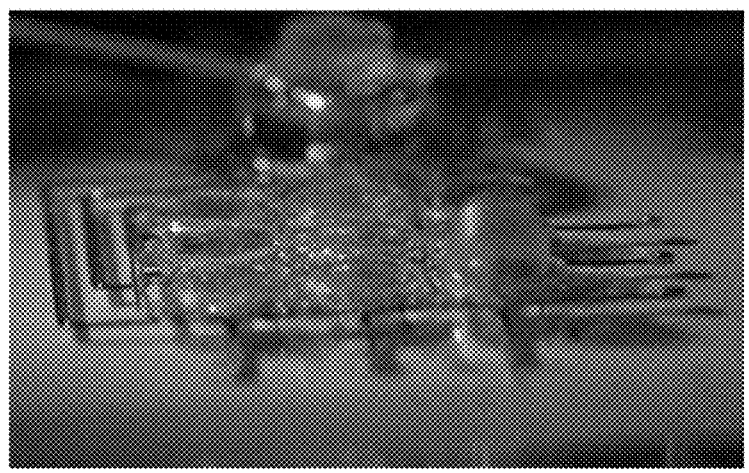

An example of actuating such an actuator array is illustrated in FIGS. 11A-11C. For example, a first actuator of an actuator array is seen actuated in FIG. 11A, a second actuator of the actuator array is seen actuated in FIG. 11B, and a third actuator of the actuator array is seen actuated in FIG. 11C.

Figure 12A:
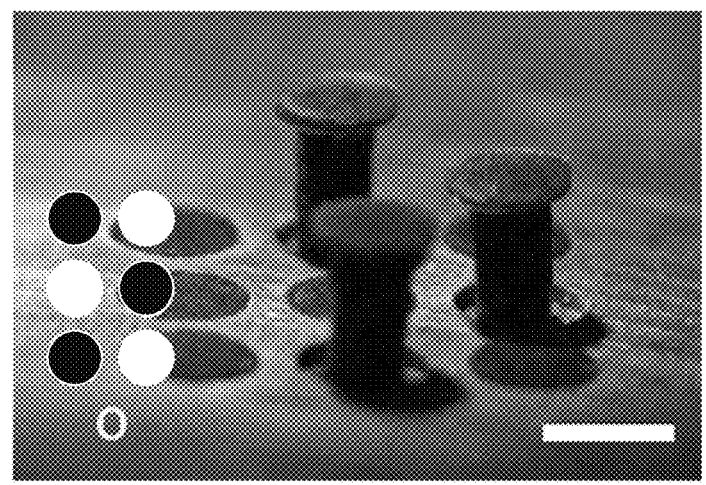
FIGS. 12A-12C are photographs showing actuation of various actuators of an example actuator array embodiment to form braille letter patterns.
Figure 12B:
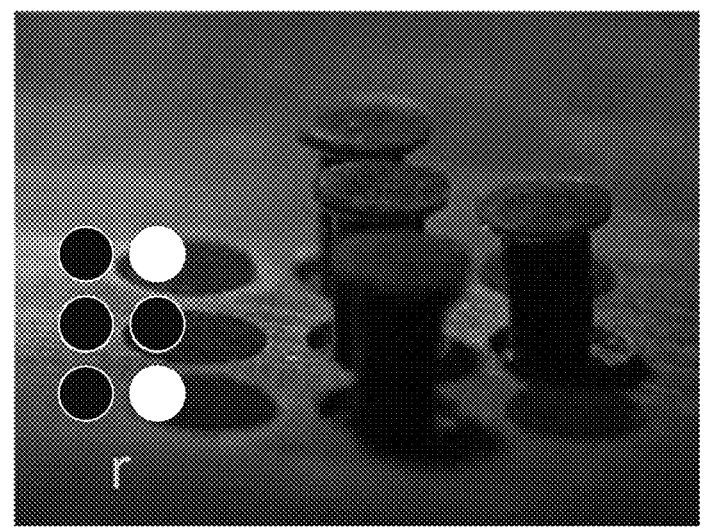
Figure 12C:
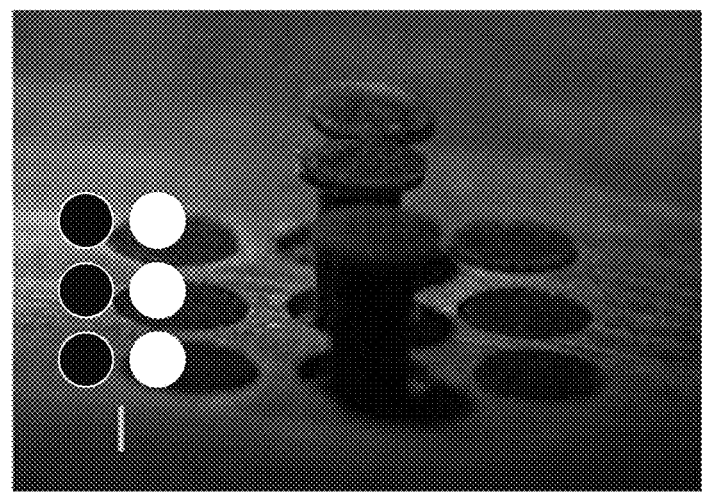

In another embodiment, each actuator of an actuator array is configured to raise a pin which can then be read as part of a braille display (see FIGS. 12A-12C). FIGS. 12A-12C illustrate actuating multiple actuators in an actuator array simultaneously to form example braille characters. In FIG. 12A, three actuators of the actuator array are actuated to form the braille representation of the letter 'o'. In FIG. 12B, four actuators of the actuator array are actuated to form the braille representation of the letter 'r'. In FIG. 12C, three actuators of the actuator array are actuated to form the braille representation of the letter 'l'. In this way, each of the braille character representations can be made by actuating various actuators in the actuator array simultaneously to form a refreshable braille display.

Figure 13A:
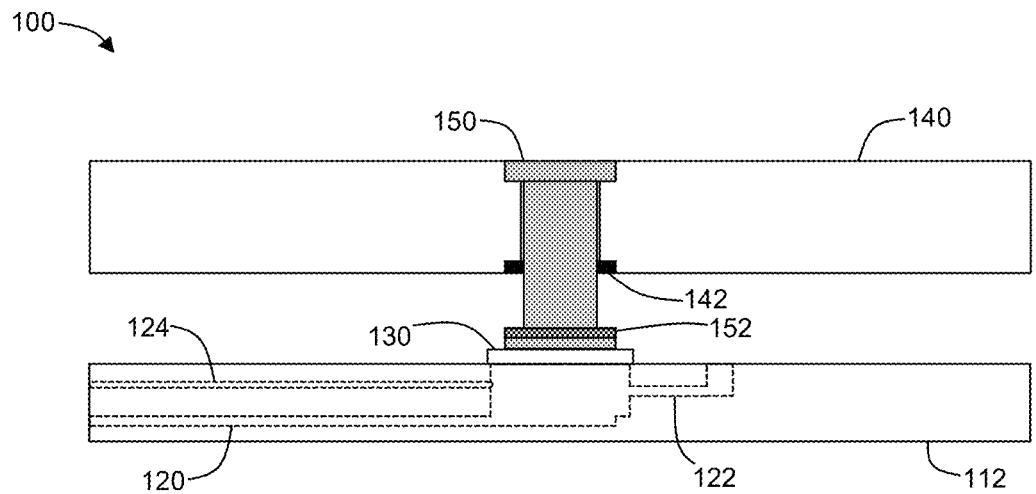
FIGS. 13A-13C are cross-section elevation diagrams showing actuation of an actuator according to another embodiment of the present disclosure.
Figure 13B:
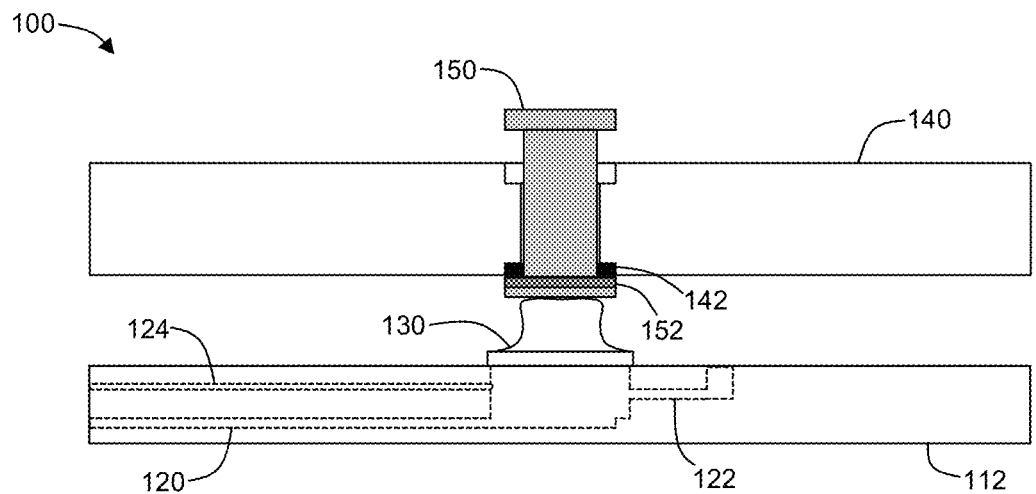
Figure 13C:
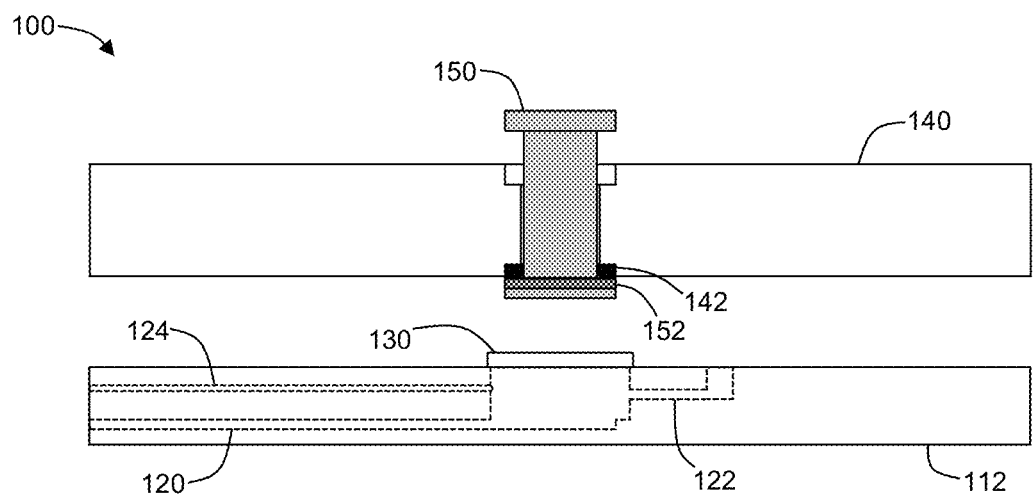

FIGS. 13A-13C illustrate operation of an exemplary pin of the braille display of FIGS. 12A-12C. In FIG. 13A, an actuator 100 is made up of a body 112 with a cavity 114. A membrane 130 cooperates with the cavity 114 to form a combustion chamber. An inlet channel 120, an outlet channel 122, and an ignitor (shown as an electrode 124) are provided in the body 112 as described above. A pin 150 is disposed through a substrate 140 and is able to move from a lower position where the top of the pin 150 is flush with a top surface of the substrate, to a raised positon, where the top of the pin 150 is raised above the top surface of the substrate. The pin 150 is located above the membrane such that movement of the membrane 130 caused by combustion in the combustion chamber will raise the pin 130.

FIG. 13A depicts the actuator 100 in an initial state with the pin 150 in the lower position as described above. FIG. 13B depicts the membrane 130 in a displaced position (caused by combustion in the combustion chamber) such that the pin 150 is moved to the raised position. In FIG. 13C, the membrane 130 has returned to an undisplaced position after combustion. In the embodiment depicted in 13C, the substrate 140 includes a magnet 142 configured to attract a cooperating member 152 of the pin 150. In this way, the pin 150 can be latched in the raised position even after the membrane 130 has retracted to an undisplaced condition. The magnet 142 may be a permanent magnet, an electromagnet, electro-permanent magnet, or other selectively operable magnet. Using a selectively operable magnet, the magnet can be de-energized to allow the pin to return to the lower position. It should be noted that other latching techniques can be used rather than the magnet shown in the exemplary embodiment. In some embodiments, a spring or other component may be configured to urge the pin back to the lower position.

Gas can begin premixed or begin as reactant liquid phase fuel and undergo vaporization and mix with air to form fuel-air mixture. In some embodiments, gas may flow through microfluidic channels to an exit port, through the combustion chamber. Passive flow may be restricted at, for example, the exit port enabling valve-less exhaust. Alternative embodiments may include routings of fuel-air mixtures that can provide some recirculation of energy in the system with less loss to the atmosphere. In some embodiments, a flow of working fluid (combustion gas) through the channels and combustion chamber(s) is adjusted to a rate just below that which would cause displacement of the membrane (i.e., caused by pressure of the working fluid without combustion). In this way, an incremental pressure increase in a combustion chamber caused by combustion will displace (move) the membrane. As such, there may be no need for additional flow restriction in the inlet and/or outlet channels.

Embodiments of the present disclosure have advantages including energy being ipso facto internal to the system since combustible gases actuate the system. Further, mechanical actuation of the system only requires electrical breakdown-no sustained voltage or current is necessary. Some embodiments may be made all-soft (using a hyperelastic material construction). No valves are necessary for operation, and the system has high resilience including resistance to impacts and sudden forces-due to its soft, e.g., silicone, construction. There need be no moving components. The construction may be simple when performed by lithography.

In the following, statements describing various further examples of the present disclosure are described:

Statement 1. An actuator, comprising: a body having a cavity; a membrane (e.g., a soft deformable membrane, a piston, or the like) configured to cooperate with the cavity to form a combustion chamber, wherein the membrane is configured to deflect/move in response to a change in a pressure within the combustion chamber; an inlet channel in fluid communication with the combustion chamber; an ignitor (e.g., heating element, catalyst, electrodes such as, for example, a metal, a liquid metal, other conducting material, an ionic liquid used in liquid conductor solutions, and the like, or combinations thereof) operable to ignite a combustible gas (e.g., methane, butane, other hydrocarbon-based fuels, other combustible gases, liquids, hydrogen peroxide, or solid propellants with or without oxygen mixed in, and the like, or combinations thereof) contained within the combustion chamber; and an outlet channel in fluid communication with the combustion chamber.

Statement 2. An actuator according to Statement 1, wherein the body is monolithic, optionally with ports for the inlet channel, outlet channel, and the ignitor.

Statement 3. An actuator according to any one of Statements 1-2, wherein the body comprises a first layer and a second layer.

Statement 4. An actuator according to any one of Statements 1-3, wherein the first layer is a side-wall and the second layer is a base-wall.

Statement 5. An actuator according to any one of Statements 3-4, wherein a port for the inlet channel is in the first layer or the second layer, wherein the outlet channel is in the first layer or the second layer, and wherein a port for the ignitor is in the first layer or the second layer.

Statement 6. An actuator according to any one of Statements 1-5, wherein the ignitor extends into the cavity fully or partially, or wherein the ignitor is in an antechamber within the body (or a first layer or second layer thereof) proximate the cavity.

Statement 7. An actuator according to any one of Statements 1-6, wherein the body is made of a single material or multiple materials (e.g., metal, plastic, vinyl).

Statement 8. An actuator according to any one of Statements 3-7, wherein the first layer is made of a first material and the second layer (e.g., metal, plastic, vinyl, Sylgard 184, Ecoflex 00-30, and the like, or combinations thereof) is made of the first material (e.g., metal, plastic, vinyl, Sylgard 184, Ecoflex 00-30, and the like, or combinations thereof).

Statement 9. An actuator according to any one of Statements 3-8, wherein the first layer is made of a first material (e.g., metal, plastic, vinyl, and the like, or combinations thereof) and the second layer is made of a second material (e.g., metal, plastic, vinyl, and the like, or combinations thereof).

Statement 10. An actuator according to any one of Statements 1-9, wherein the inlet channel is disposed within the body and/or the electrode is disposed within the body.

Statement 11. An actuator according to any one of Statements 3-10, wherein at least a portion of the inlet channel is disposed within the first layer or the second layer, wherein at least a portion of the outlet channel is disposed within the first layer or the second layer, and wherein at least a portion of the ignitor is disposed within the first layer or second layer.

Statement 12. An actuator according to any one of Statements 1-11, wherein the ignitor is an electrode operable to cause a spark suitable (e.g., above the dielectric breakdown voltage of air, e.g., 3 kV/mm and the like) (e.g., according to the Paschen dielectric breakdown curve appropriate for the gas composition within the combustion chamber) to ignite the combustible gas.

Statement 13. An actuator according to any one of Statements 1-12, wherein the ignitor is a heating element configured to heat the combustible gas past an ignition point thereof.

Statement 14. An actuator according to any one of Statements 1-13, wherein the ignitor is a catalyst sufficient to ignite the combustible gas on contact.

Statement 15. An actuator according to any one of Statements 1-14, wherein the body has an elastic modulus which is greater than an elastic modulus of the membrane (e.g., the membrane may have a greater elasticity than the body).

Statement 16. An actuator according to any one of Statements 1-15, wherein the membrane is configured to deflect by deforming in response to a change in pressure.

Statement 17. An actuator according to any one of Statements 1-16, wherein the membrane is configured to deflect by unfolding/folding (e.g., it may be rigid with specific creases/joints) in response to a change in internal pressure.

Statement 18. An actuator according to any one of Statements 1-17, wherein the inlet channel is configured for flow of the combustible gas (e.g., derived from the combustible liquid phase fuel which undergoes vaporization and mixing with air to form the combustible gas and may be delivered to the actuator pre-mixed or separate components).

Statement 19. An actuator according to any one of Statements 1-18, wherein the inlet channel is impermeable to the combustible gas.

Statement 20. An actuator according to any one of Statements 1-19, further comprising a combustible gas at least partially contained in the combustion chamber, wherein the combustible gas may optionally comprise oxygen and methane.

Statement 21. An actuator according to any one of Statements 1-20, wherein the combustible gas is suitable for pure oxygen combustion according to the equation:

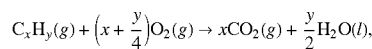

for varying quantities x of carbon and y of hydrogen.

Statement 22. An actuator according to any one of Statements 1-20, wherein the combustible gas is suitable for combustion of hydrocarbons in air according to the equation:

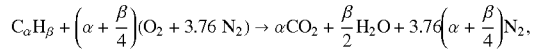

for varying quantities α of carbon and β of hydrogen.

Statement 23. An actuator according to any one of Statements 1-22, wherein the combustible gas and/or oxygen are supplied externally or on a device comprising the actuator.

Statement 24. An actuator according to any one of Statements 1-23, wherein the outlet channel is configured for flow of the combustible gas (fully or partially combusted or uncombusted) or other combustion product(s).

Statement 25. An actuator according to any one of Statements 1-24, wherein the body is monolithic and the outlet channel is disposed within the body.

Statement 26. An actuator according to any one of Statements 3-24, wherein the outlet channel is disposed within the first layer or second layer or partially within the first layer and partially within the second layer.

Statement 27. An actuator according to any one of Statements 1-26, wherein the outlet channel is configured to restrict flow passively (e.g., by an orifice, check-valve, or the like, or combinations thereof).

Statement 28. An actuator according to any one of Statements 1-27, wherein the body, membrane, and/or inlet channel are/is constructed of a soft material (e.g., elastomeric materials, such as, for example, room-temperature vulcanization silicones, polydimethylsiloxane (PDMS), M4601, Sylgard 184, Ecoflex 00-30, urethanes, or silicone, and the like, or combinations thereof).

Statement 29. An actuator according to any one of Statements 1-28, further comprising a filter (e.g., steel mesh, and the like) configured to reduce backpropagation of combustion products (e.g., flames) from the combustion chamber into the inlet channel (e.g., at the time of combustion).

Statement 30. An actuator according to any one of Statements 12-29, wherein the electrodes are metal (e.g., a traditional solid metal or a metal that is a liquid at room temperature).

Statement 31. An actuator according to any one of Statements 12-30, wherein the electrode comprises wires.

Statement 32. An actuator according to any one of Statements 12-31, wherein the electrode comprises circuit traces.

Statement 33. An actuator according to any one of Statements 12-32, wherein the circuit traces are arranged on a circuit board (e.g., a printed-circuit board, and the like).

Statement 34. An actuator according to any one of Statements 30-33, wherein the metal is a liquid metal (e.g., gallium, eutectic indium-gallium (EGaIn), or Galinstan, and the like, or combinations thereof).

Statement 35. An actuator according to Statement 34, wherein the liquid metal does not resist shear stresses.

Statement 36. An actuator according to any one of Statements 34-35, wherein the liquid metal is configured as a robust electrode connection.

Statement 37. An actuator according to any one of Statements 34-36, wherein the electrode comprises a liquid metal arrange to have a spark gap (e.g., 50 μm-100 μm, or up to 5 mm, or as appropriate depending on the size of the device) with high resistivity, but not affecting its ability to produce a spark.

Statement 38. An actuator according to any one of Statements 34-37, wherein the liquid metal does not erode after causing a spark.

Statement 39. An actuator according to any one of Statements 34-38, wherein the liquid metal forms an oxide layer to be solid-like and stable at the open-air interface.

Statement 40. An actuator according to any one of Statements 1-39, wherein the membrane has high resilience (e.g., resistance to impacts or resistance to sudden forces, toughness, deflection of membrane without breaking, resistant to puncture, resistance to high or low temperatures, resistance to other internal and external impacts, and other properties as appropriate defining resilience).

Statement 41. An actuator according to any one of Statements 1-40, wherein the actuator has no mechanically-moving components (e.g., in total, or other than the membrane/piston).

Statement 42. An actuator according to any one of Statements 12-41, wherein the electrodes are configured to cause the spark in response to an applied voltage.

Statement 43. An actuator according to any one of Statements 42-43, wherein the spark is within the combustion chamber.

Statement 44. An actuator according to any one of Statements 42-43, wherein the spark is low-energy.

Statement 45. An actuator array comprising two or more actuators according to any one of Statements 1-44.

Statement 46. An actuator array according to Statement 45, wherein the inlet channels of the two or more actuators are, e.g., parallel, side-by-side, isolated, connected at a single plenum/hub, connected at multiple plenums/hubs, or form a inlet channel tree, which may have one or multiple inlets leading to the inlet channels.

Statement 47. An actuator array according to any one of Statements 45-46, wherein the actuators are arranged in a two-dimensional array.

Statement 48. An actuator array according to Statement 47, wherein the two-dimensional array is configured to have shared inlet channels and outlet channels.

Statement 49. A device comprising one or more actuators or actuator arrays of any one of Statements 1-48 (e.g., tactile device that may be high definition, a braille display that may be refreshable, a micro-peristaltic pump, a haptic feedback device, a virtual reality device, or a soft robot that may be configured for precision control, and the like).

Statement 50. A method of making a device comprising one or more actuators or actuator arrays of any one of Statements 1-49 (e.g., tactile device that may be high definition, a braille display that may be refreshable, a micro-peristaltic pump, a haptic feedback device, a virtual reality device, or a soft robot that may be configured for precision control).

Statement 51. A method of operating a device comprising one or more actuators or actuator arrays of any one of Statements 1-49 (e.g., tactile device that may be high definition, a braille display that may be refreshable, a micro-peristaltic pump, a haptic feedback device, a virtual reality device, or a soft robot that may be configured for precision control, and the like).

Statement 52. A method of making an actuator, comprising: forming a body having a cavity; disposing a membrane on the body such that the membrane cooperates with the cavity to form a combustion chamber, wherein the membrane is configured to move (e.g., deform or deflect) in response to a change in a pressure within the combustion chamber; forming an inlet channel in fluid communication with the combustion chamber; forming an ignitor operable to ignite a combustible gas contained within the combustion chamber; and forming an outlet channel in fluid communication with the combustion chamber.

Statement 53. A method according to Statement 52, wherein forming the membrane, the body, the inlet channel, and/or the outlet channel is by, e.g., soft lithography, 3D printing, using micromachined molds, microelectromechanical system (MEMS) lithography, subtractive manufacturing, and/or semiconductor lithography, and the like, or combinations thereof.

Statement 54. A method according to any one of Statements 52-53, wherein forming the membrane, body, inlet channel, outlet channel, and electrode comprises (in any appropriate order): spraying nonstick coatings on a 3D-printed mold of device's individual soft layers, the 3D-printed mold configured to form a combustion chamber layer having a combustion chamber, fuel inlet channels, and electrode inlet channels; filling the 3D-printed molds with a liquid elastomer pre-polymer; curing, by heating, the liquid elastomer-prepolymer to form the combustion chamber layer within the 3D-printed mold; peeling the combustion chamber layer out of 3D-printed mold; coating the combustion chamber layer with a thin, uncured elastomer prepolymer over the inlet channel, bonding the combustion chamber to a thin bottom membrane; filling electrode inlet channels in the combustion chamber layer with a liquid metal; cutting a hole through the membrane under the combustion chamber; cleaning the electrode at a wall of combustion chamber of an excess liquid metal; peeling the fuel line layer out of the 3D-printed mold; coating the fuel line layer with a thin, uncured elastomer prepolymer over inlet channels bonding the fuel line layer to a bottom of the combustion chamber layer; forming a hyperelastic membrane and cutting the hyperelastic membrane into a shape matching the combustion chamber shape; and bonding the hyperelastic membrane to the combustion chamber layer using a silicone epoxy adhesive; wherein the actuator is configured to connect to an external fuel source and/or power electronics.

Statement 55. A method according to any one of Statements 52-54, wherein the electrode is formed by injecting liquid metal into the inlet channel or another inlet channel configured to hold the electrode.

Statement 56. A method according to Statement 55, wherein the injection is performed using a syringe and a tube tip Statement 57. A method of making an actuator array including making one or more actuators using the method of any one of Statements 52-56.

Statement 58. A method of actuating the actuator or actuator array of any one of Statements 1-49, comprising: passing a combustible gas through the inlet channel into the combustion chamber; and operating the ignitor, thereby causing the combustible gas within the combustion chamber to combust, thereby causing an increase in pressure within the combustion chamber, thereby deflecting the membrane.

Statement 59. A method according to Statement 58, wherein operating the ignitor comprises applying an applied voltage to an electrode to yield a spark within the combustion chamber.

Statement 60. A method according to Statements 58-59, further comprising vaporizing a combustible liquid phase fuel and combining the resultant vaporized combustible liquid phase fuel with air to form the combustible gas.

Statement 61. A method according to any one of Statements 58-60, further comprising passing the uncombusted or combusted combustible gas or through an outlet channel to atmosphere.

Statement 62. A method according to any one of Statements 58-61, further comprising passively restricting the flow of uncombusted or combusted gas through the outlet channel to atmosphere.

Statement 63. A method according to any one of Statements 58-62, wherein actuating the actuator composes actuating an actuator array.

The steps of the method described in the various embodiments and examples disclosed herein are sufficient to carry out the methods of the present invention. Thus, in an embodiment, the method consists essentially of a combination of the steps of the methods disclosed herein. In another embodiment, the method consists of such steps.

Although the present disclosure has been described with respect to one or more particular embodiments, it will be understood that other embodiments of the present disclosure may be made without departing from the scope of the present disclosure.

What is claimed is:

1. An actuator, comprising:
   a body having a cavity;
   a membrane configured to cooperate with the cavity to form a combustion chamber, wherein the membrane is configured to move in response to a change in pressure within the combustion chamber;
   an inlet channel in fluid communication with the combustion chamber;
   an ignitor operable to ignite a combustible gas contained within the combustion chamber;
   an outlet channel in fluid communication with the combustion chamber;
   wherein the body comprises a first layer and a second layer, and
   wherein at least a portion of the inlet channel is disposed within the first layer or the second layer, at least a portion of the outlet channel is disposed within the first layer or the second layer, and at least a portion of the ignitor is disposed within the first layer or second layer.

2. The actuator of claim 1, wherein at least a portion of the ignitor extends into the cavity.

3. The actuator of claim 1, wherein the ignitor comprises an electrode operable to cause a spark for igniting a combustible gas.

4. The actuator of claim 3, wherein the electrode comprises a solid metal, a liquid metal, or a eutectic.

5. The actuator of claim 3, wherein the electrode comprises at least two electrode channels, each having an end separated by a spark gap, and further comprising:
   a first electrode channel disposed in the body, the first electrode channel having a terminal end at the combustion chamber;
   a second electrode channel disposed in the body, the second electrode channel having a terminal end at the combustion chamber and spaced apart from the terminal end of the first electrode channel; and
   a liquid metal disposed in the first electrode channel and the second electrode channel.

6. The actuator of claim 1, wherein the ignitor comprises a heating element, a catalyst, or an electrode.

7. The actuator of claim 1, wherein the body has an elastic modulus greater than an elastic modulus of the membrane.

8. The actuator of claim 1, further comprising a combustible gas at least partially contained in the combustion chamber.

9. The actuator of claim 8, wherein the combustible gas is suitable for pure oxygen combustion according to the equation:

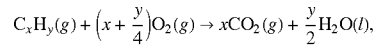

for varying quantities x of carbon and y of hydrogen, wherein x and/or y is 0 or greater.

10. The actuator of claim 8, wherein the combustible gas is suitable for combustion of hydrocarbons in air according to the equation:

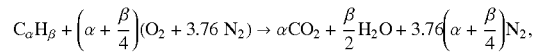

for varying quantities $\alpha$ of carbon and $\beta$ of hydrogen, wherein $\alpha$ and/or $\beta$ is 0 or greater.

11. The actuator of claim 1, wherein the outlet channel and/or the inlet channel is configured to restrict flow passively.

12. The actuator of claim 1, wherein the body and/or membrane is constructed of a soft material.

13. The actuator of claim 1, further comprising a filter configured to reduce backpropagation of combustion from the combustion chamber into the inlet channel.

14. An actuator array comprising two or more actuators according to claim 1.

15. The actuator array of claim 14, wherein the inlet channels of the two or more actuators are parallel, side-by-side, isolated, connected at a single plenum/hub, connected at multiple plenums/hubs, and/or form an inlet channel tree having one or multiple inlets leading to the inlet channels.

16. A method of making an actuator, comprising:
   forming a body having a cavity;
   disposing a membrane on the body such that the membrane cooperates with the cavity to form a combustion chamber, wherein the membrane is configured to move in response to a change in a pressure within the combustion chamber;
   forming an inlet channel in fluid communication with the combustion chamber; and
   forming an ignitor operable to ignite a combustible gas contained within the combustion chamber;
   forming an outlet channel in fluid communication with the combustion chamber; and
   wherein forming the membrane, the body, the inlet channel, and/or the outlet channel is by soft lithography, 3D printing, using micromachined molds, microelectromechanical system (MEMS) lithography, subtractive manufacturing, and/or semiconductor lithography.

17. The method of claim 16, wherein the ignitor comprises at least two electrode channels, each having an end separated by a spark gap, and further comprising:
   forming a first electrode channel in the body, the first electrode channel having a terminal end at the combustion chamber;
   forming a second electrode channel in the body, the second electrode channel having a terminal end at the combustion chamber and spaced apart from the terminal end of the first electrode channel; and
   injecting a liquid metal into the first electrode channel and the second electrode channel.

18. A method of actuating an actuator, comprising:
   providing an actuator according to claim 1;
   passing a combustible gas through the inlet channel into the combustion chamber; and operating the ignitor, thereby causing the combustible gas within the combustion chamber to ignite such that a pressure within the combustion chamber increases and the membrane moves.

19. An actuator, comprising:
a body having a cavity;
a membrane configured to cooperate with the cavity to form a combustion chamber, wherein the membrane is configured to move in response to a change in pressure within the combustion chamber;
an inlet channel in fluid communication with the combustion chamber;
an ignitor operable to ignite a combustible gas contained within the combustion chamber;
an outlet channel in fluid communication with the combustion chamber;
a combustible gas at least partially contained in the combustion chamber, wherein the combustible gas is suitable for pure oxygen combustion according to the equation:

$$C_xH_y(g) + \left(x + \frac{y}{4}\right)O_2(g) \rightarrow xCO_2(g) + \frac{y}{2}H_2O(l),$$

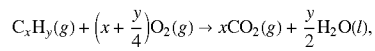

for varying quantities x of carbon and y of hydrogen, wherein x and/or y is 0 or greater.

20. An actuator array comprising two or more actuators, each actuator comprising:

a body having a cavity;

a membrane configured to cooperate with the cavity to form a combustion chamber, wherein the membrane is configured to move in response to a change in pressure within the combustion chamber;

an inlet channel in fluid communication with the combustion chamber;

an ignitor operable to ignite a combustible gas contained within the combustion chamber; and an outlet channel in fluid communication with the combustion chamber.

21. The actuator array of claim 20, wherein the inlet channels of the two or more actuators are parallel, side-by-side, isolated, connected at a single plenum/hub, connected at multiple plenums/hubs, and/or form an inlet channel tree having one or multiple inlets leading to the inlet channels.

* * * * *